United States Patent
Joho et al.

(10) Patent No.: US 6,777,848 B1
(45) Date of Patent: *Aug. 17, 2004

(54) LAMINATED STATOR BODY FOR AN ELECTRICAL MACHINE

(75) Inventors: Reinhard Joho, Küttigen (CH); Albrecht Bock, Gorxheimertal (DE)

(73) Assignee: Alstom, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 272 days.

(21) Appl. No.: 09/220,055

(22) Filed: Dec. 23, 1998

(30) Foreign Application Priority Data

Dec. 23, 1997 (DE) .......................................... 197 57 451

(51) Int. Cl.$^7$ ................................................. H02K 1/16
(52) U.S. Cl. ........................ 310/216; 310/254; 310/217; 310/64; 310/58; 310/192; 310/256
(58) Field of Search ................................ 310/216, 254, 310/217, 64, 58, 256, 192

(56) References Cited

U.S. PATENT DOCUMENTS

| | | | | |
|---|---|---|---|---|
| 925,271 A | * | 6/1909 | Behrend ....................... 310/65 |
| 2,711,492 A | * | 6/1955 | Ballman ...................... 310/254 |
| 2,774,000 A | * | 12/1956 | Ross ............................ 310/216 |
| 2,812,459 A | * | 11/1957 | Smith ........................... 310/216 |
| 3,421,034 A | * | 1/1969 | Hershberger ................ 310/192 |
| 3,886,256 A | * | 5/1975 | Ohuchi et al. .............. 310/216 |
| 4,494,030 A | * | 1/1985 | Mulach et al. .............. 310/256 |
| 4,613,842 A | * | 9/1986 | Ichiyama et al. ........... 310/216 |
| 4,665,329 A | * | 5/1987 | Raschbichler ............... 310/216 |
| 4,672,252 A | * | 6/1987 | Spirk .......................... 310/216 |
| 4,761,576 A | | 8/1988 | Savage ......................... 310/51 |
| 4,894,573 A | * | 1/1990 | Simpson ..................... 310/254 |
| 5,283,486 A | * | 2/1994 | Kobori ........................ 310/216 |
| 5,491,371 A | * | 2/1996 | Ooi ............................. 310/216 |
| 5,875,540 A | * | 3/1999 | Sargeant et al. ............ 310/216 |
| 5,886,435 A | * | 3/1999 | Dymond ....................... 310/51 |
| 5,942,831 A | * | 8/1999 | Yamada et al. ............. 310/216 |
| 6,058,596 A | | 5/2000 | Jansen et al. ................. 29/598 |
| 6,072,259 A | * | 6/2000 | Kawabata et al. .......... 310/216 |

FOREIGN PATENT DOCUMENTS

DE 3833130 A1 6/1989
DE 4122067 1/1992

(List continued on next page.)

OTHER PUBLICATIONS

JP 1–126141 A; In: Patents Abstracts of Japan, E–808, Aug. 18, 1989, vol. 13, No. 374.

(List continued on next page.)

Primary Examiner—Burton S. Mullins
Assistant Examiner—Jaydi Aguirrechea
(74) Attorney, Agent, or Firm—Oblon, Spivak, McClelland, Maier & Neustadt, P.C.

(57) ABSTRACT a high-voltage generator, notches (3) leading radially inward are provided in each segmental lamination (1) on the radial outside of the laminated stator body and end in a relief opening. The notches (3) cause the amplitude and the frequency of, for example, a 4-node vibration occuring during operation to be limited to noncritical values, although the laminated body is undersized mechanically with regard to its yoke height ($J_H$).

15 Claims, 1 Drawing Sheet

FOREIGN PATENT DOCUMENTS

| | | | | |
|---|---|---|---|---|
| DE | 19510729 | | 9/1996 | |
| DE | 19510729 A1 | * | 9/1996 | |
| DE | 29623073 U1 | | 11/1997 | |
| GB | 2 303 744 | | 2/1997 | |
| JP | 53041704 A | * | 4/1978 | ............ H02K/1/16 |
| JP | 55086340 A | * | 6/1980 | ............ H02K/1/16 |
| JP | 56129542 a | * | 10/1981 | ............ H02K/1/16 |
| JP | 59-149751 | | 8/1984 | |
| JP | 61-180539 | | 8/1986 | |
| JP | 61180539 A | * | 8/1986 | ............ H02K/1/12 |
| JP | 1-126141 | | 5/1989 | |
| JP | 09009532 A | * | 1/1997 | ............ H02K/1/12 |
| JP | 2000201443 A | * | 7/2000 | ............ H02K/1/16 |

OTHER PUBLICATIONS

"Konstrukton Elektrischer Maschinen"["Construction of Electrical Machines"], E. Wiedemann and W. Kellenberger, Springer–Verlag, Berlin/Heidelberg, 1967, pp. 337–339.

* cited by examiner

LAMINATED STATOR BODY FOR AN ELECTRICAL MACHINE

BACKGROUND OF THE INVENTION

1. Field of the Invention

The present invention relates to the field of electrical machines. It relates to a laminated stator body for a rotating electrical machine.

Such an electrical machine is disclosed, for example, by "Konstruktion elektrischer Maschinen" ["Construction of electrical machines"], E. Wiedemann and W. Kellenberger, Springer-Verlag, Berlin/Heidelberg, 1967, pages 337–339.

2. Discussion of Background

In rotating alternating-current machines, such as, for example, generators or motors, magnetic fields rotate in operation at the frequency of the rotational speed. These fields attempt to change the laminated stator body into a rotating ellipse in the case of two-pole machines and into a rotating square in the case of four-pole machines. These deformations of the laminated stator body are the cause of magnetic noises and of vibrations of the stator casing. In this case, however, these deformations are also directly related to the geometric proportions of the laminated stator body. Contributory variables are the outside diameter of the laminated stator body and the yoke height of the laminated body. The depth of the slots for accommodating the stator winding, which are distributed over the inner circumference of the bore and are oriented to the longitudinal axis of the machine, also has an effect.

Typical designs of 2-pole generators with their so-called 4-node vibrations of the laminated stator body, which occur under operating conditions, make it necessary for the laminated body to be arranged resiliently in a stator casing. However, the utilization of the resilient arrangement is limited not least by the strength of the stator winding overhangs arranged outside the laminated stator body.

The use of generators as turbomachines in high-voltage networks is especially problematical—and the essence of the present invention is also directed at this problem—, the term high voltage referring here to a far higher voltage than the operating voltages of 20–30 kV which are common today. Such high-voltage generators are used in a voltage range of up to 400 kV or higher and are connected directly—that is, without the interconnection of a transformer—to a power transmission network having a conventional voltage level of, for example, 400 kV. The advantages of a direct network connection lie in particular in the saving of transformers and associated switchgear, including installation space and maintenance cost.

In high-voltage generators, however, a larger number of turns than in conventional machines is a basic precondition. The larger number of turns must therefore be inserted in deeper slots of a laminated stator body. In publication JP 1-126141, the notches are filled with a permeable material, which, however, means that more material is required and thus the costs are higher.

In the case of the yoke height—that is, the distance between the slot root and the outside diameter of the laminated stator body—the dimension, in view of the magnetic flux flowing through, must not fall below a minimum. However, the combination of deep stator slots and yoke heights designed with regard to the flux density leads to operation in the vicinity of the 4-node natural frequency and thus to inadmissible amplitudes at the abovementioned 4-node vibrations. The amplitudes of the vibrations would increase up to an order of magnitude of 150 m, which may lead to the mechanical destruction of the electrical machine. In terms of economical transport, strengthening the laminated stator body by increasing the diameter, is limited by the so-called track loading gage.

SUMMARY OF THE INVENTION

Accordingly, one object of the invention is to design a novel laminated stator body for a high-voltage turbogenerator of the type mentioned at the beginning in such a way that, with a comparatively small outside diameter of the laminated stator body and large slot depths for the stator winding, a sufficiently high mechanical strength in respect of operationally induced vibration amplitudes is achieved.

According to the invention, the object is achieved by the features of the first claim.

The advantages of the invention may be seen, inter alia, in the fact that, by virtue of the notches on the radial outside of the segmental laminations forming the laminated stator body, the natural frequency of the laminated body is considerably reduced and comes to lie below the rotational excitation frequency, whereas the magnetic conditions in the laminated body remain largely unaffected. The notches are not filled with a permeable material, as in the prior, art but are filled with air. Here, the notching permits a comparatively small diameter of the laminated stator body, which comprises the magnetic part of a high-voltage generator having deep slots for the conductor bars or conductor coils. It is especially advantageous if the notches end radially on the inside in a relief opening.

A first preferred embodiment of the invention is defined in that twice the number of notches as slots for the stator winding are arranged in the laminated stator body, the notch depth being in the order of magnitude of 20% of the yoke height.

A second preferred embodiment of the laminated stator body according to the invention is distinguished in that the number of slots and notches in the laminated stator body is the same, the notch depth being in the order of magnitude of 40% of the yoke height.

A width of the notches of about 0.5 mm to 1 mm is especially preferred.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein the single FIGURE shows, in simplified representation, a preferred exemplary embodiment for the segmental laminations forming the laminated stator body according to the invention.

DESCRIPTION OF THE PREFERRED EMBODIMENTS

Figure 1:
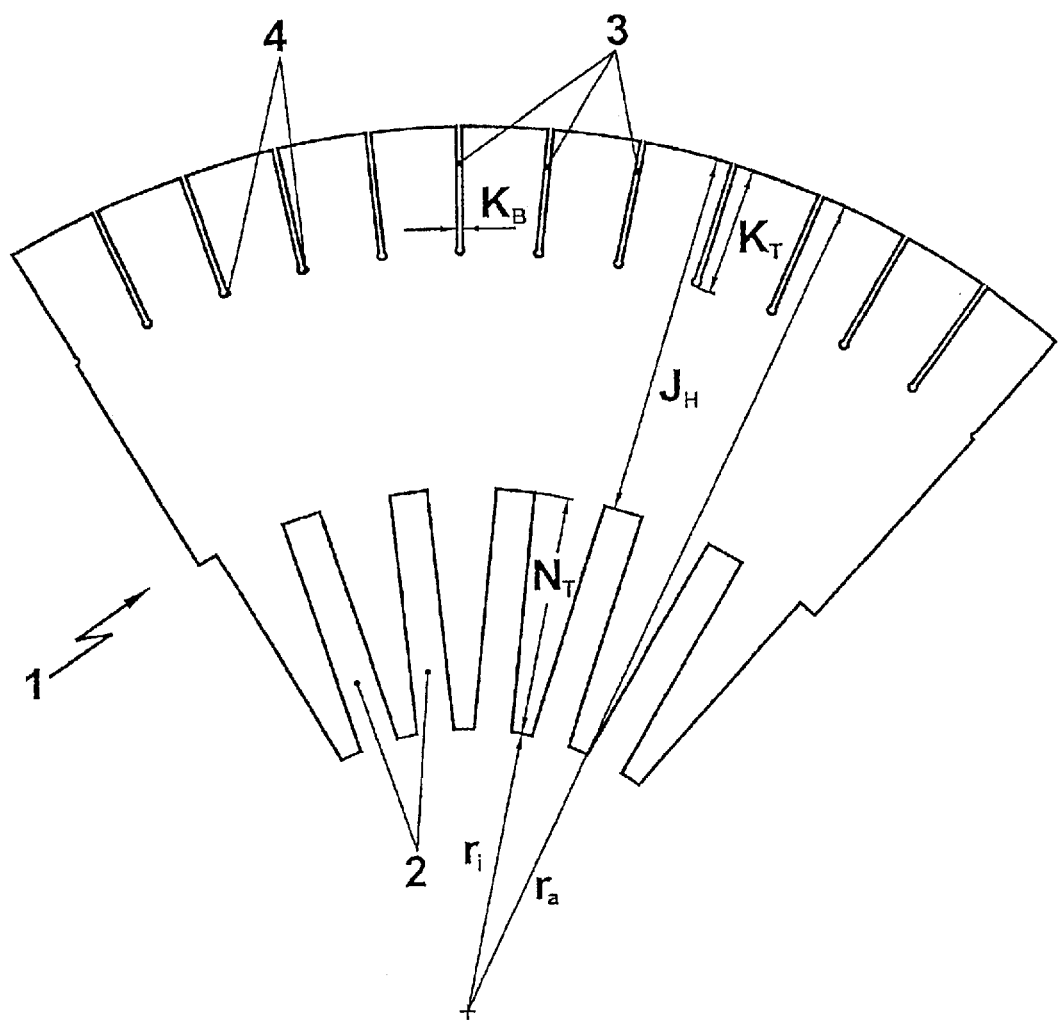

Referring now to the drawing, wherein only the parts essential for the invention are shown and designated, a preferred exemplary embodiment of a segmental lamination 1 is shown in the FIGURE, this segmental lamination 1 typically being provided on its radial inside with slots 2 for accommodating a stator winding (not shown here). A large number of such segmental laminations 1 are arranged next to one another in both the circumferential direction and the axial direction—that is, perpendicularly to the drawing plane—and form in their entirety a laminated stator body (likewise not shown). All the segmental laminations 1 are oriented in such a way that the slots 2 are arranged in alignment with one another.

According to the invention, the segmental laminations 1 are provided on their radial outside with a number of notches 3, which have a width $K_B$ of between 0.5 mm and 1 mm and are arranged axially in alignment with one another. The notches 3 end radially on the inside in a so-called relief opening 4. The notches 3 are filled with air.

A laminated stator body, composed of the segmental laminations described, exhibits especially good mechanical properties in combination with optimum magnetic properties when used in a high-voltage generator, which is operated, for example, at operating voltages of 400 kV and above. For this purpose, as compared with conventional generators having operating voltages of 20 kV–30 kV, a larger number of turns of a stator winding have to be inserted into a slot 2 having a correspondingly greater depth $N_T$. As already discussed in the introduction, the yoke height $J_H$—that is, the dimension between the root of slot 2 and the outer radius $r_a$—must be correspondingly large for reliable operation under conventional mechanical vibration loading.

The invention now comes into play here, without the yoke height $J_H$ having to be critically increased in view of the operationally induced vibrations. This would be a measure which is undesirable with regard to both the greatly increasing weight and an uneconomical transport size. The invention makes it possible, then, for the yoke height $J_h$ to be designed essentially from magnetic aspects, that is, for a smaller yoke height $J_H$ to be provided than would be necessary when considering the mechanical strength in operation.

A first typical numerical example will explain the invention in more detail:

If the laminated stator body of a high-voltage generator is designed only according to magnetic aspects, this results in a slot depth $N_T$ of about 600 mm, a slot width $N_B$ of 60 mm, a yoke height $J_H$ of 500 mm, and a yoke outside diameter $r_a$ of 3600 mm. Such a magnetically correct design, in a two-pole high-voltage generator of conventional type, would cause a 4-node vibration having an amplitude of about 150 μm at 95 Hz. In this case, the excitation frequency is 100 Hz. These operating values are inadmissible.

The arrangement according to the invention of radial notches 3 arranged so as to be periodically distributed over the outer circumference reduces the 4-node vibrations to an amplitude of about 50 m at 70 Hz. These values are noncritical under operating conditions. The number of notches 3 in this case is 72, which is twice as much as the number of slots 2. The notch depth $K_T$ is in the order of magnitude of 100 mm, the notch depth $K_T$ thus being in the order of magnitude of 20% of the yoke height $J_H$.

A second solution of the invention is shown in the following example:

At the same geometric dimensions of the outside diameter $r_a$, the slot depth $N_T$ and the yoke height $J_H$, the same number of notches 3, distributed uniformly over the outer circumference, as the number of slots 2 produces an equally good reduction in the mechanical vibration loading, as described above, if the depth of the notches 3 is in the order of magnitude of 200 mm. In this case, the notch depth $K_T$ is in the order of magnitude of 40% of the yoke height $J_H$.

Substantially deeper notches 3 than those shown in the two design variants cause the vibration amplitudes to increase again, on account of the increasing proportion of static deformation.

The function of the relief openings 4 is the same in the solutions shown according to the invention. Undesirable tearing-out in the root of the notches 3 under operationally induced vibration loading is thereby prevented. the invention is of course not restricted to the exemplary embodiments shown. Thus, for example, another combination of the number of slots and the number of notches is also conceivable, in which case the notch depth must than also be adapted accordingly.

Obviously, numerous modifications and variations of the present invention are possible in light of the above teachings. It is therefore to be understood that, within the scope of the appended claims, the invention may be practiced otherwise than as specifically described herein.

LIST OF DESIGNATIONS

1 Segmental lamination
2 Slot
3 Notch
4 Relief opening
$r_a$ Outside radius
$r_I$ Inside radius
$N_T$ Slot depth
$K_T$ Notch depth
$K_B$ Width of the notch 3
$J_H$ Yoke height

What is claimed as new and desired to be secured by Letters Patent of the United States is:

1. A laminated stator body for an electrical machine, which laminated stator body is composed of a multiplicity of segmental laminations, each segmental lamination being provided on a radial inside with slots for accommodating conductors of a stator winding, each slot extending from the radial inside to a root portion nearest to a radial outside of each segmental lamination, with the portion of each segmental lamination remaining between the root portion and the radial outside defining a yoke height, wherein each segmental lamination is provided on the radial outside with periodically distributed notches all of equal dimensions including a notch depth that is much less than yoke height, with the number and depth of the notches being selected to increase mechanical strength by reducing vibration amplitudes during machine operation, the notches and slots of actually adjacent segmental laminations in the laminated stator body being arranged in alignment with one another to form said laminated stator body, said notches being filled only with an atmosphere surrounding said laminated stator body.

2. The laminated stator body as claimed in claim 1, wherein the notches end in a relief opening at their radially inner end.

3. The laminated stator body as claimed in claim 2, wherein the number of notches is twice as great as the number of slots.

4. The laminated stator body as claimed in claim 2, wherein the number of notches is equal to the number of slots.

5. The laminated stator body as claimed in claim 2, wherein the notches have a width of between 0.5 mm and 1 mm.

6. The laminated stator body as claimed in claim 1, wherein the number of notches is twice as great as the number of slots.

7. The laminated stator body as claimed in claim 6, wherein the notch depth is on the order of magnitude of 20% of the yoke height.

8. A The laminated stator body as claimed in claim 7, wherein the notches have a width of between 0.5 mm and 1 mm.

9. The laminated stator body as claimed in claim 6, wherein the notches have a width of between 0.5 mm and 1 mm.

10. The laminated stator body as claimed in claim 1, wherein the number of notches is equal to the number of slots.

11. The laminated stator body as claimed in claim 10, wherein the notch depth is on the order of magnitude of 40% of the yoke height.

12. At The laminated stator body as claimed in claim 11, wherein the notches have a width of between 0.5 mm and 1 mm.

13. The laminated stator body as claimed in claim 10, wherein the notches have a width of between 0.5 mm and 1 mm.

14. The laminated stator body as claimed in claim 1, wherein the notches have a width of between 0.5 mm and 1 mm.

15. The laminated stator body as claimed in claim 1, wherein the atmosphere is air.

* * * * *